United States Patent [19]
Metcalf

[11] Patent Number: 5,257,822
[45] Date of Patent: Nov. 2, 1993

[54] VEHICLE TIRE WATER SPRAY CONTROL SYSTEM COMPONENTS

[76] Inventor: George E. Metcalf, 15805 SE. 12th Pl., Bellevue, Wash. 98008

[21] Appl. No.: 784,517

[22] Filed: Oct. 29, 1991

Related U.S. Application Data

[63] Continuation-in-part of Ser. No. 413,439, Sep. 27, 1989, Pat. No. 5,080,397, which is a continuation-in-part of Ser. No. 200,837, Jun. 1, 1988, abandoned, which is a continuation-in-part of Ser. No. 813,646, Dec. 26, 1985, abandoned, which is a continuation-in-part of Ser. No. 509,875, Jul. 1, 1983, abandoned.

[51] Int. Cl.$^5$ .............................................. B62D 25/18
[52] U.S. Cl. ..................... 280/851; 280/848
[58] Field of Search ..................... 280/851, 847, 848

[56] References Cited

U.S. PATENT DOCUMENTS

| | | | |
|---|---|---|---|
| 3,473,825 | 10/1969 | Ochs ..................... | 280/851 |
| 3,778,086 | 12/1973 | Moore et al. ............. | 280/851 |
| 4,290,619 | 9/1981 | Goodall ................. | 280/851 |
| 4,382,606 | 5/1983 | Lightle ................. | 280/851 |
| 4,398,739 | 8/1983 | McKenzie et al. ......... | 280/851 |
| 4,421,333 | 12/1983 | Van Dyke ............... | 280/851 |
| 4,427,208 | 1/1984 | Jurges ................... | 280/848 |
| 4,436,319 | 3/1984 | Clutter ................. | 280/848 |
| 4,585,242 | 4/1986 | Sparks .................. | 280/848 |
| 5,080,397 | 1/1992 | Metcalf ................. | 280/848 |

FOREIGN PATENT DOCUMENTS

| | | | |
|---|---|---|---|
| 2074109 | 10/1981 | United Kingdom ........... | 280/848 |
| 2146598 | 4/1985 | United Kingdom ........... | 280/851 |

*Primary Examiner*—David M. Mitchell
*Attorney, Agent, or Firm*—Roy E. Mattern, Jr.

[57] ABSTRACT

An improved fender flap and improved side skirts are presented for suppressing spray and coalescing and directing water droplets thrown from rotating tires of vehicles via centrifugal forces, or formed over the tires by the impact of high velocity throw on flat surfaces over the wheels. They are primarily of value to wheeled vehicles, especially large commercial trucks or tractor-trailer combinations. The preferred embodiments herein disclosed are used as fender flap and side skirts, located respectively behind and beside the wheel.

The fender flap has symmetric closely spaced apart wedges aligned vertically parallel to the planes of rotation of the tire and a base having slanted slots between the wedges that deflect the coalesced and condensed water toward the center of the fender flap behind the fender flap.

The side skirt is designed to coalesce fine spray and to carry the coalesced water to flow along the horizontal upper surfaces of wedges or ridges that become gutters on the side on the trailer facing into the wind and to fall at the fender flap location rather than being blown against a tire slots in two versions enhance the condensation. The conversion of the horizontal surfaces to gutters on the side of the vehicle facing into the wind occurs because the wind's force bends the flexible, hinged, or loosely hung side skirt inward. The side skirts are self-cleaning because on the side facing away from the wind the skirts bend outward from the cross-winds's force, letting the water flow across the upper surfaces, cleaning them before falling away from the tires to the roadway surface.

3 Claims, 2 Drawing Sheets

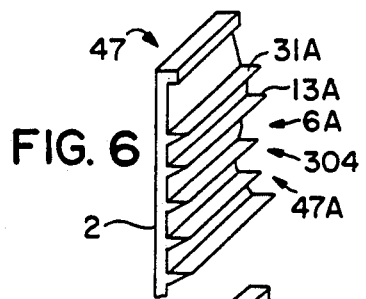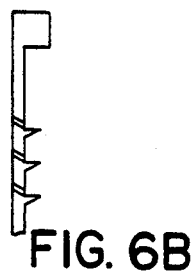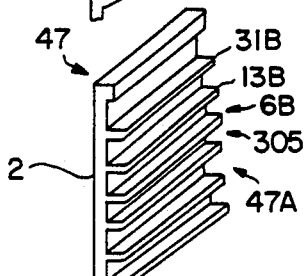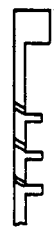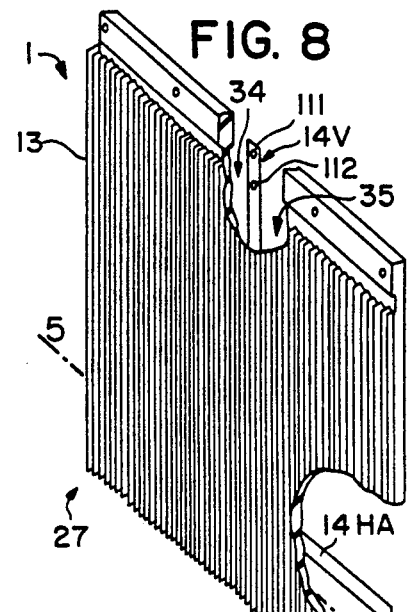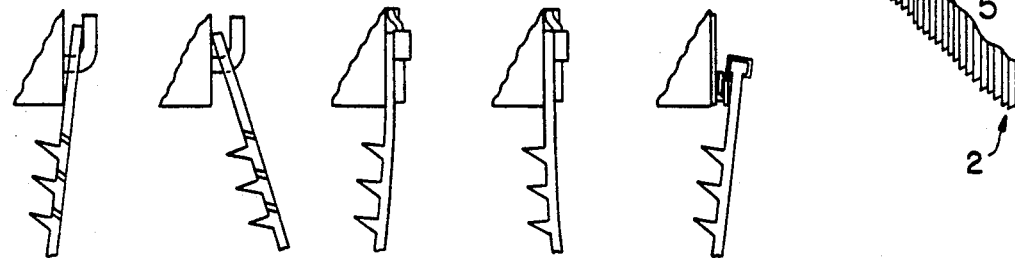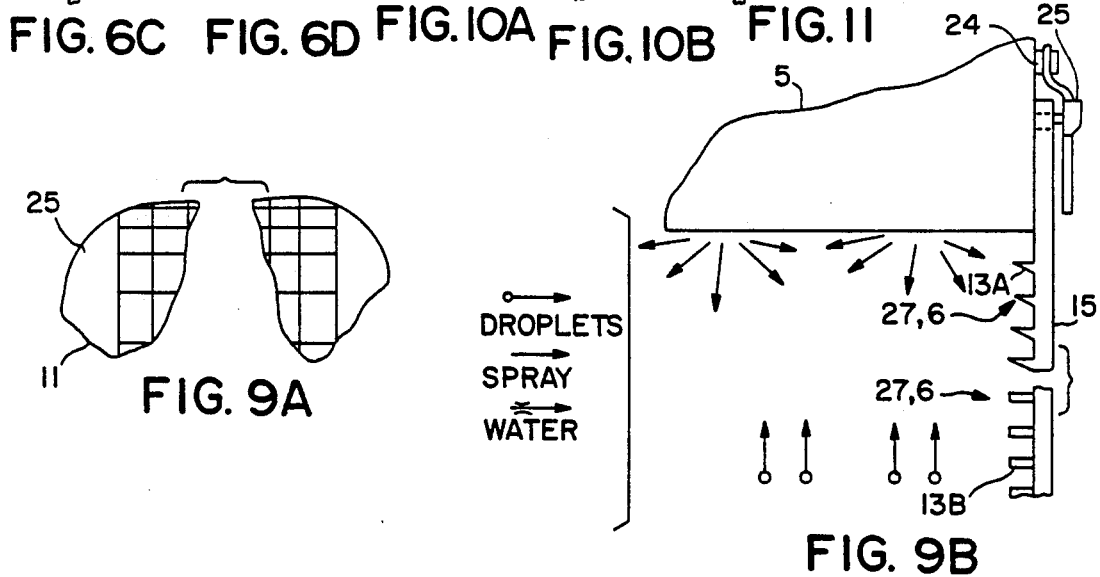

VEHICLE TIRE WATER SPRAY CONTROL SYSTEM COMPONENTS

CROSS REFERENCES

This application is the fourth continuation in part application filed while the third continuation in part application Ser. No. 07/413,439 filed Sep. 27, 1989, was still pending. Ser. No. 07,413,439, and now U.S. Pat. No. 5,080,397 was, in turn a continuation in part of Ser. No. 07/200,837 filed Jun. 1, 1988 and now abandoned, which was a continuation in part of Ser. No. 06/813,646 filed Dec. 26, 1985 and now abandoned, which was a continuation in part of Ser. No. 06/509,875, filed Jul. 1, 1983, now abandoned.

The first, second and third continuation in part applications were determined to be considered as copending with the original application Ser. No. 06/509,875, filed Jul. 1, 1983. Claims allowed after the third continuation in part application have been accepted. This application modifies the specifications and claims for side skirts and includes one modification of the fender flaps.

BACKGROUND OF THE INVENTION

Water droplets of "tread throw", hereinafter referred to as "throw" are thrown from rotating tires of vehicles traveling at high speed on wet surfaces and impact against surfaces of the vehicle, causing the throw droplets to fragment into smaller droplets of spray. This spray impairs the visibility of drivers of these and other vehicles during wet conditions. Tests have demonstrated erratic directional control by drivers of following cars and trucks which are enveloped in this spray, especially from the large commercial trucks and tractor-trailer combinations which are moving ahead of them or beside them as they travel on wet roadways. Drivers of these large vehicles also have difficulty seeing, via their rear view mirrors, through the spray generated by their own vehicles, which occasionally causes accidents as they change lanes.

Good devices have evolved for over-the-wheel and behind the wheel installation to reduce the spray formation. Several patents have also been issued to condense the spray, formed over the wheel from high velocity throw, as it is blown laterally toward the adjacent lane. These latter devices are called side skirts. This patent application describes an improved side skirt. Prior attempts include the following. Schlegel (UK) Limited in UK Patent No. 2,074,109 of 1980, uses bristles to condense the laterally moving spray effectively, however, in a cross wind, the falling water blows against the tire to spray again. Sparks in U.S. Pat. No. 4,585,242 of 1984 creates a down draft with his side skirt to drive the spray downward toward the road surface. McKenzie in U.S. Pat, No. 4,398,739 of 1983 uses rubber buttons to condense spray, but again lets it fall off the skirt to blow against the tire in a cross wind. Lightle in U.S. Pat. No. 4,382,606 of 1983 uses vertical ridges facing the wheel to cause the condensate to fall directly downward, again blowing onto the tire in a cross wind. Clutter in his U.S. Pat. No. 4,436,319 of 1984 collects the spray in an enclosed fender and diverts the water to fall toward the center of the vehicle. Jurges in his U.S. Pat. No. 4,427,208 of 1984 provides a fender with symmetric wedges facing the throw above the tire, the wedges lying parallel to the rotational planes of the tire, having decreasing height for those that are outside the edge of the tire, to the extent that much of the water must run downwardly and blow against the tire in a cross wind. Goodall in U.S. Pat. No. 4,290,619 of 1981 provides "screens" consisting of several channels beside the wheel into which the spray can flow, thereafter condensing and being wind-driven rearward to a vertical discharge pipe and thence to be carried laterally toward the center of the vehicle with water from the rear screen behind the wheel to be ejected inside the tracks of the tires in a rearward direction. The largely enclosed horizontal screens therein will fill with dirt from the roadway and cease to function. Finally, Crowley, in UK Patent No. GB 2,146,598 A of 1985 uses horizontal ridges on a rigid rear panel behind the wheels, the panel facing the flow from the tire directly and the ridges carrying the water laterally to vertical discharge pipes. Although one of his designs is flexible, it is so designed to allow enclosed lateral channels to open and accept the throw, the largely enclosed channel carrying the condensate laterally to the drain(s), the large panel being held rigidly either by the drains or by anti-lift devices.

SUMMARY

Each embodiment of the fender flap and the side skirts presented has a receiving side and an opposite side. The receiving side comprises a plurality of symmetric or asymmetric wedges or ribs integrally formed with and extending outward from the planar surface of a base or its equivalent, in some cases the base being hollowed out beneath the wedges as shown by dashed lines in FIGS. 2A and 2B to reduce weight, cost of manufacture, and the cost of materials.

In fender flaps which are exposed to dense high velocity throw, the wedges are spaced closely apart, but not more than 37% of the base width of the wedges, the wedges in this case having an optimum apex angle of 35 degrees, although they will perform well within the limits of 30 to 45 degrees. The embodiment herein presented has slanted slots between the wedges that direct the emerging water toward the center of the fender flap behind it. Symmetric or asymmetric wedges are used with the slanted slots between.

The wedges on the fender flap herein presented are preferably symmetric, for strength, having oppositely sloping faces with the apexes and the wedges being oriented symmetrically toward oncoming throw droplets, in order that droplets strike the surface at a small angle relative to the surface, thereby reducing collision energy and consequently spray formation. Experimentally, the optimum wedge apex angle was found to be 35 degrees for a wedge height of 7/16 inch on a ¼ inch thick base with 1/16 inch wedge separation and slanted slots between the wedges.

Upon striking the sloping surfaces of the wedges, the small throw droplets in part condense to form larger droplets which then travel along the sloping faces and into the region between the wedges forming water which passes through the slots as a streamlike flow to thereafter flow from the slots at the opposite side of the spray controller toward its center and then downwardly onto the road surface.

The fender flap spray controllers are made from an impact resistant, chemical resistant, abrasion resistant, weathering resistant material such as high or low density polyethylene, polyurethane, rubber and/or fibre, i.e. uncured residue from making tires, or metal, and may be made using injection molding, compression molding, or, for some embodiments, extrusion. If the side skirts are made from a non-flexible material, they must be hinged at the top or designed to be installed loosely in a fitting such as 25 in FIG. 9B that permits some play to allow wind-induced flexing and the resulting gutter-formation on the side facing into the wind and self-cleaning on the side facing away from the wind.

The asymmetric wedges used on the base for the side skirts are at least 9/32 inch high for effective coalescence and carrying of water, but 15/32 inch or less in height for convenience of shipping, handling, and installation, and for economy of manufacture. On side skirts, exposed only to the low speed mist from high speed throw impacting nearby surfaces, the horizontal upper surfaces of these horizontal wedges or ridges may be spaced farther apart, up to 1½ inches. The side skirts condense the secondary, slow-moving finer spray that flows laterally from the high speed impact area above the tires. The condensed water flows down onto and along the near-horizontal upper surfaces of the wedges or ridges to fall at the fender flap location, thereafter moving behind the fender flap because of the pressure gradient caused by vehicular motion, rather than being blown in a cross wind to fall again upon the tire and thereby generate additional spray. On the side of the vehicle facing into the wind, these flexible side skirts bend inward converting the horizontal surfaces to gutters, assisting the rearward flow. An alternate form of side skirt has perpendicular or slanted slots between the wedges as are illustrated in FIG. 2 for fender flaps. These wedges may also be mounted on an unperforated base. The preferred design has slanted slots between the wedges. It provides more-effective coalescence by drawing more of the mist to the skirt via the Bernoulli Effect, rather than having it flow under the side skirt to add to the mist blocking the adjacent drivers' vision.

DESCRIPTION OF DRAWINGS

FIG. 6 is a perspective view of a section of a side skirt spray controller using horizontally aligned wedges, the top surface of which is near horizontal.

FIG. 6B is an end view of the skirt in FIG. 6 having slots added to improve coalescence.

FIGS. 6C and 6D show the skirt of FIG. 6B tilted inwardly and outwardly respectively on loose fittings by the forces of cross-winds.

FIG. 7 is a perspective view of a section of a side skirt spray controller using horizontal ridges.

FIG. 7B is an end view of a skirt having slots added to improve coalescence.

FIG. 8 is a fender flap made of flexible material having anti-lift reinforcing bars.

FIGS. 9A and 9B comprise a composite end view from the rear of side skirt sections using ridges and wedges, respectively, attached to the side of a trailer beside a tire. The fitting 25 is shown loosened to allow tilting of side skirts made of non-flexible material. A hinge may be made in the skirt just below the trailer also to allow slight rotation for non-flexible materials.

FIGS. 10A and 10B show the skirts of FIG. 9B flexed inwardly and outwardly, respectively, by the force of cross-winds, the holder 25 being adjusted to the tight position.

FIG. 11 presents the loose attachment of a known Schlegel skirt holder mounted so as to let the skirt tilt inwardly and outwardly in cross-winds, shown making the ridges into gutters on the side facing into the wind.

DESCRIPTION OF THE PREFERRED EMBODIMENTS

The Fender Flap Spray Controller

Figure 4:
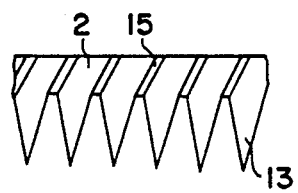
FIG. 4 is an end view of a section of symmetric wedges with slanted slots between having angles greater than the half-angles of the wedges.

The symmetrical wedges 13 of the fender flap are shown in FIGS. 2, 4 and 12 having opposite sloping faces 31 which receive the high speed throw. These surfaces directly converge at an apex which may be slightly rounded as in FIG. 2 or flattened as in FIG. 12 for ease of manufacture. The wedges 13 are arranged on the base 2 to point symmetrically toward the oncoming throw from the tires 11 during travel of the vehicle 4 along the wet road surface. The bisectors of the sloping faces 31 of the wedges 13 are positioned in parallel alignment with the plane of rotation of the wheels and tires of the vehicle. Slanted slots extend through the base 2, being longitudinally aligned and spaced apart between the wedges 13 to form apertures through which water and air may pass during travel of the vehicle. The slanted slot array center, section shown in FIG. 12 is the preferred configuration used in the fender flap of this invention. As shown in FIG. 2 each slot has a forward surface 41 and rearward surface 42 with the rearward surface being a continuation of a sloping face of the adjacent wedge 13. As shown in FIG. 2, the slots 15 extend through the base 2 and 12 slanted at an angle relative to the planar surface 43 of the base 2 to prevent the spray from passing directly through the slot 15 without impact, whereby it provides an impediment to the motion of the water droplets, thereby assisting in the coalescence of the water droplets of the throw and directing the larger water droplets and coalesced stream-like flow of water in the direction desired behind the fender flap toward the vertical centerline of the fender flap as shown in FIG. 12.

The slots of this invention utilize a "split flow" design as shown in FIGS. 2A and 2B or 3A and 3B in FIG. 12, whereby the slots 15 on the left half of 34 of the spray controller are angled to the right thereby directing large droplets and stream-like water from the left of the opposite side 47 of the spray controller to the right and the slots 15 on the right half 35 of the spray controller 27 are angled to the left so as to direct the larger droplets and flow of stream-like water from the right of the opposite side 47 of the spray controller to the left. Thus the flows from the two halves of the spray controller converge toward its center while falling to the roadway behind it.

Figure 3A:
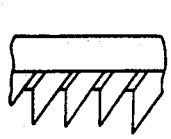
FIG. 3 consists of two end views of sections of controllers having arrays of closely spaced apart asymmetric wedges separated by slanted slots, in 3A deflecting condensed water to the right, and in 3B deflecting it to the left as used in the current fender flap on its left and right sides to direct the waer toward its center, behind it.
Figure 3B:
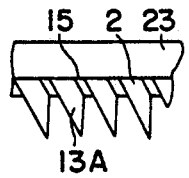
Figure 5:
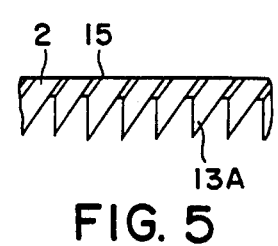
FIG. 5 is an end view of asymmetric wedges with slanted slots between having angles greater than the sloped surface of the wedges.

The asymmetric wedges of FIG. 3A and FIG. 3B can also be used on the left and right halves of the fender flap spray controller to guide the flow of water toward the center behind the flap. So also can the slots of FIGS. 4 and 5 which have slots at angles greater than the half angle of the symmetric wedges and greater than the angles of the sloped sides of the asymmetric wedges respectively. The symmetrical wedge is preferred for its strength. Angles greater than the half angle of the symmetrical wedge may be required for thinner bases, which may be preferred to save weight, in order to prevent passage of the throw through the slots without impact.

Slot widths range from 3/64 to ⅛ inch at the bases of the symmetric wedges or 1/32 to ⅛ inch between asymmetric wedges and they are contiguous thereto. The base thicknesses range from 3/32 inch to 5/16 inch, or, if hollow wedges are used, the slots have an equivalent depth. Wedges range from 3/16 to ⅝ inch high. Symmetric wedge angles are 30 to 60 degrees. Asymmetric wedge angles are a maximum of 45 degrees. Slot angles continue the wedge angle or greater, as measured from the perpendiuclar, through the base, the rear wall of the slot preventing non-impact passage of throw through the base.

Figure 1:
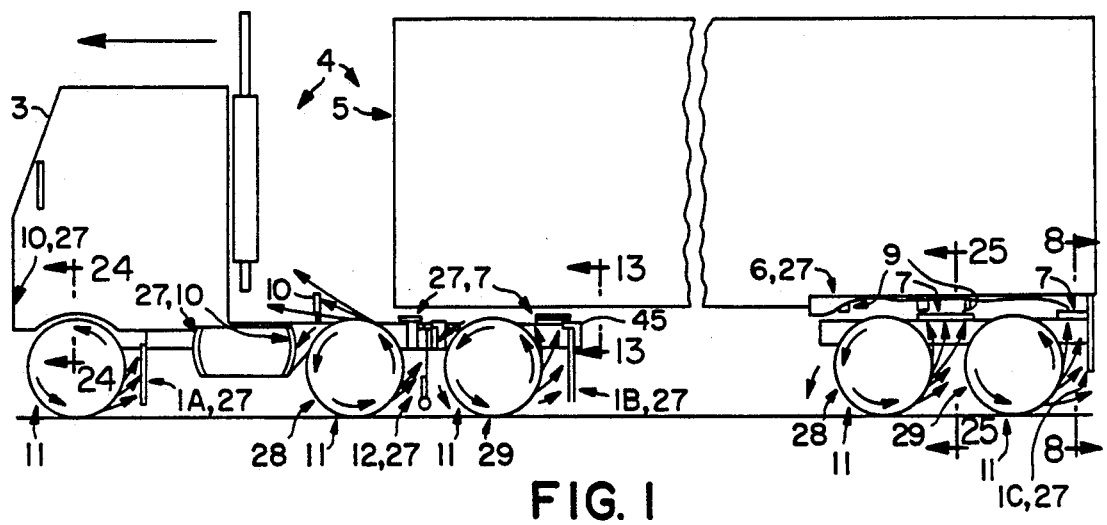
FIG. 1 is a side view of the tractor-trailer vehicle with the various spray controllers of the vehicle spray control system mounted at various locations for suppressing, coalescing and directing the spray, including the fender flap spray controllers behind each set of tandems and the side skirt spray controllers discussed herein. Arrows indicate the direction of the trajectory of the throw droplets and the relative angles at which they impact the array of wedges on the receiving side of the spray controllers.
Figure 2A:
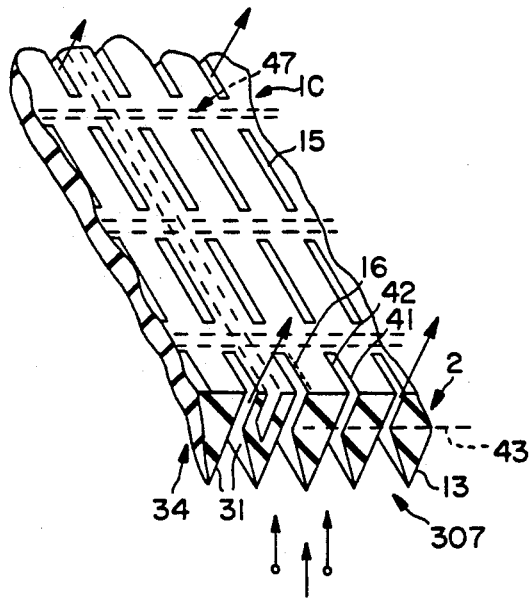
FIG. 2 shows two perspective sections of spray controllers having closely spaced apart symmetric wedges with slanted slots between, deflecting water to the right in FIG. 2A and to the left in FIG. 2B.
Figure 2B:
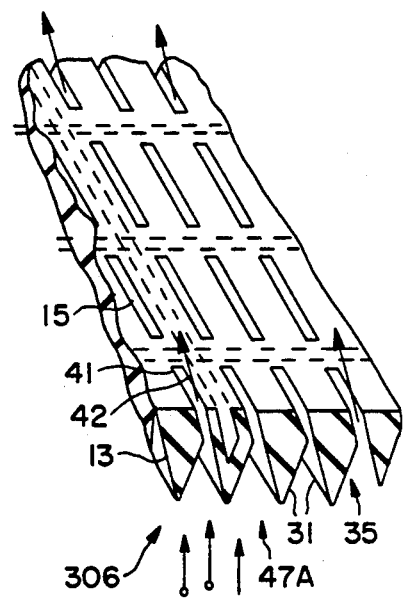

Excellent experimental results were obtained from the symmetric wedge embodiments of FIGS. 2A and 2B for a configuration with a base thickness ¼ inch, wedge height 7/16 inch, wedge lateral separation and slot width 1/16 inch, slot longitudinal separation ⅛ inch and length ¾ inch, and wedge apex angle 35 degrees.

Good results were also obtained using 1 inch long slots, ⅛ inch end-to-end separation, 90 durometer ⅛ inch thick red rubber, ¼ inch high asymmetric wedges having one side perpendicular to the base and the other side slanted at 35 degrees, the same slope as the 1/16 inch wide slots between.

Thus, lateral wedge separation to wedge width ratios of 25% and 36% and longitudinal slot separation to length ratios of 33% and 12 5% were used experimentally. Improved longitudinal slot separation to slot length ratio may be obtained for weaker materials by using crosswise fibers between the slot ends. Materials such as those with the trade names Aramid and Kevlar may be used. Greater lateral strength can also be obtained by molding from plastics such as low or high density polyethylene, urethane or metal. The ratio is less than 35% and the minimum length ½ inch.

The Side Skirt Spray Controllers

Illustrated in FIGS. 6 and 7, the side skirt spray controllers 6 are positioned outside the tracks of the tires as shown in FIGS. 9A and 9B, being suspended from the vehicle adjacent to the tops of the tires 11 with the base 2 being parallel to the plane of rotation of the tires when neither flexed nor tilted. In the embodiments shown, the wedges 13A or ridges 13B have nearly horizontal upper surfaces 31A or 31B when hanging vertically. Spray impacting the side skirt and wedges or ridges coalesces and flows downwardly to the horizontal upper surfaces of the wedges or ridges and thence rearwardly driven by air motion to fall beside the fender flap. The flexibility of the side skirts on the side of the vehicle facing into the wind allows them to deflect slightly inwardly as shown in FIG. 10A, making gutters of the upper surfaces of the wedges or ridges on the side skirts. FIG. 10B shows the flexible skirt on the downwind side as it self-cleans. If made of a rigid material, the loose fitting hanger or hinges can be used to obtain this wind induced deflection. The loose fittings shown in FIGS. 6C, 6D, 9B, and 11 restrict inward tilting to prevent damage to the skirt by the tire. Spaced apart wedges or ridges are used. The wedges must provide adequate surface to carry the water and adequate strength for durability. Also, the wedge spacing may be larger than on fender flaps, although a wedge height of 7/16 inch, a wedge angle of 30 degrees, and a spacing between wedges of 1/16 inch is believed to be about optimum. These dimensions lead to a spacing of about 5/16 inch between upper surfaces. Small variations in height, angle or spacing are not important. The spacing between surfaces of wedges or ridges may be as great as 1½ inches. The side skirt spray controllers 6 in FIGS. 9 and 10 are secured to the trailer 5 with quick disconnect fittings 19, which further comprise locking arms 24 and fittings 25. The locking arm 24 is pivotally secured to the trailer 5 underbody to be rotatably moved upwardly when the side skirt spray controllers 6 are being installed or removed as shown in FIG. 9B. The locking arms 24 secure the side skirt spray controllers in place. In the preferred embodiment, the side skirt spray controllers 6 have horizontally positioned wedges 34 with horizontal upper surfaces 31A and upward slanting slots between the wedges to enhance the effectiveness by using the Bernoulli force to draw more spray through the skirt that would otherwise flow beneath it to the adjacent lane. The slots are expensive to provide, however, and the only practical design may be unslotted.

Tests have shown that a large percentage of spray thrown by the rotating tires of the moving vehicles is generated by the impact of the throw droplets above the wheels and tires. Side skirt spray controllers 6 may be even more effective in controlling road surface spray than the more conventionally placed fender flap spray controllers 1 and need be only approximately six to eight inches in height to provide an effective surface area to suppress and to coalesce the spray deflected to the sides of the tires.

Some professionals are convinced that a single smooth surface coalesces this mist as effectively as a textured surface. However, review of test data implies that in a cross wind, water falling from the bottoms of skirts is blown against the tires, causing additional secondary spray. Thus, horizontal wedges shown in FIGS. 6, 9B and 10 or horizontal ribs shown in FIGS. 7, 9A and 11, having near horizontal upper surfaces, when not deflected are provided to carry the coalesced water rearwardly to fall at the fender flap, being drawn to fall behind it by the air pressure gradient thus keeping it away from the high speed tread. Experimental horizontal wedges were made of neoprene which wets with water. Non-wetting surfaces may be less effective.

An additional advantage of this flexible or loosely-hung side skirt is that it is self-cleaning, the horizontal upper surfaces tilting downwardly on the downwind side, allowing the water flowing over them to clean them before blowing away from the tire. Skirt wedges, also, may be slightly rounded as in FIG. 10A or slightly flattened as shown in FIGS. 10B and 12 for eash of manufacture.

Regarding the Manufacture of Spray Controllers

The various embodiments of spray controllers 27 can be made by using plastic, metal, and/or new rubber compound, in extruding simple wedge 13 arrays, without slots 15, or in a compression or injection molding process forming embodiments with or without slots. A two-step process of first molding, then cutting out the slots, may also be used. Fiber, scrap rubber from the manufacture of tires, may also be used as the primary material, mixed with appropriate portions of compound, to minimize cost. However, high or low density polyethylene is believed to be superior in most embodiments. Wire in the scrap rubber from tire manufacture is a major impediment because of mold damage in compression molding processes.

SUMMARY OF ADVANTAGES

The fender flap of this invention provides excellent spray control by decreasing the impact angle of throw droplets with the surface, thereby reducing the collision energy with the fender flap surface and the resulting formation of spray, and by coalescing the throw droplets to form water which flows to the roadway surface in the shielded region behind the fender flap and between the wedges on the forward surface, also reducing spray formation.

Minimum usage of only the fender flap spray controllers 1 using wedge arrays illustrated in FIGS. 2, 3, and 4 effectively control only about 30% of the throw angle. More than one third of the throw angle is over the wheels.

The side skirts of this invention are directed toward partial control of the spray originating in the region over the wheels, including the region over and between tandem axles. The spray generated by the high velocity throw striking the flat surfaces over the wheel coalesces on the side skirt, flowing down the flexible, hinged or loosely fitting side skirts and thence along ridges or wedges having horizontal upper surfaces which become gutters on the side of the vehicle facing into the wind-to fall at a fender flap. On the side of the vehicle facing away from the wind the skirts are forced outwardly by the wind, tilting the horizontal surfaces downwardly, the water flowing over them, cleaning them and then falling to the roadway away from the tire, not bursting again into spray.

Each of these, the improved fender flap and the improved side skirt, increases safety on the highways, each supplementing the improvement by the other. These together with the other spray reducing components illustrated and described in the applicants patent complete a spray reducing system which contributes a truly significant improvement in the visibility experienced by the drivers of vehicles traveling on wet highways.

I claim:

1. An improved vehicle spray control system apparatus component which is called a side skirt, comprising a flexible spray controller which is positioned vertically beyond the vertical plane projection of a tire, having a base, having ribs with short longitudinally aligned slots between that are separated end-to-end to cause the air to flow outwardly by the Bernoulli Effect, the ribs extending laterally from the base toward the tire, horizontally extending from ahead of the tire rearwardly to a vertical spray controller called a fender flap located behind the tire, which ribs are oriented longitudinally and horizontally, and have upper surfaces which are substantially horizontal, the upper surfaces being spaced apart up to 1½ inches vertically, one being at the very bottom edge of the base, the longitudinal flexibility of the base near its top being such that on the side of the vehicle facing into a cross-wind the lateral flexing inwardly of the side skirt causes the upper surfaces of the ribs to become gutters, which carry much of the water to the fender flap where the pressure differential causes to fall largely in the protected region behind the flap, and on the side of the vehicle facing away from the cross-wind the lateral flexing outwardly causes them to become self-cleaning.

2. An improved vehicle spray control system apparatus component which is called a side skirt, comprising a flexible spray controller which is positioned vertically beyond the vertical plane projection of a tire, having a base, having wedges with short longitudinally aligned slots between, that are separated end to end to cause air to flow outwardly by the Bernoulli Effect thereby enhancing condensation, the wedges extending laterally from the base toward the tire, horizontally extending from ahead of the tire rearwardly to a vertical spray controller called a fender flap located behind the tire, which wedges are oriented horizontally and longitudinally, and have upper surfaces which are substantially horizontal, the upper surfaces being spaced apart up to 1½ inches vertically, one being at the very bottom edge of the base, the longitudinal flexibility of the base near its top being such that on the side of the vehicle facing into a cross-wind, the lateral flexing inwardly of the side skirt causes the previously horizontal upper surfaces of the wedges to become gutter, which carry much of the water to the fender flap where the pressure differential causes to it fall largely in the protected region behind the flap, and on the side of the vehicle facing away from the cross-wind the lateral flexing outwardly causes them to become self-cleaning.

3. An improved vehicle spray control system apparatus component, hung closely behind a tire, which is called a fender flap, for suppressing spray and preventing the formation of msit by coalescing and redirecting water droplets from tread throw which has been thrown upwardly or rearwardly by the rotating tire of a vehicle via centrifugal forces of the rotational movement of the tires during travel of the vehicle along wet surfaces or roadways, comprising spray controllers, having a receiving side and an opposite side, and which each further comprise:

a. a base having a plurality of elongated slots longitudinally positioned and space apart between and contiguous to wedges on the receiving side and extending through the base angularly forming a slanted aperture through which droplets of spray pass, such droplets being suppressed upon striking wedge sloping faces and the slanted surfaces of the slots;

b. the plurality of wedges having apex angles of 60 degrees or less their faces symmetrically oriented toward oncoming droplets of spray, wherein the wedges depend outwardly from the base toward the direction of spray and the rearward surface of each of the longitudinally aligned slots between the wedges being preferably a continuation of and integral with a sloping face of an adjacent wedge, the wedges and rearward sides of slots thereby angled surface area to receive the impact of the spray water droplets thereafter suppressing and coalescing the spray droplets into larger droplets and a flow of water which is streamlike in appearance, slots therein adaptably oriented within the base whereby, with respect to a longitudinal centerline of the vehicle tires, half of the slots are slanted in one direction, in parallel alignment, toward said centerline, while the other half of the slots on the opposite side of the centerline in parallel alignment, are slanted in the opposite direction also toward said centerline to thereby guide the flow of the now suppressed and coalesced throw from the respectively divergent halves of the spray controller, and thus redirecting the flow of the water droplets through the base to thereafter be discharged from the opposite side of the spray controller toward the center of the spray controller, behind it, shielded from the vehicular wind as it falls toward the roadway surface as running water and large droplets.

* * * * *